April 6, 1926.                                         1,580,008
                    J. M. BUCHANAN
               STRING BEAN TREATING MACHINE
                  Filed June 26, 1925         6 Sheets-Sheet 1

Fig. 1.

J. M. Buchanan
      INVENTOR
BY Victor J. Evans
      ATTORNEY

April 6, 1926.

J. M. BUCHANAN 1,580,008

STRING BEAN TREATING MACHINE

Filed June 26, 1925 6 Sheets-Sheet 3

April 6, 1926.  
J. M. BUCHANAN  
STRING BEAN TREATING MACHINE  
Filed June 26, 1925  
1,580,008  
6 Sheets-Sheet 5

April 6, 1926.    J. M. BUCHANAN    1,580,008
STRING BEAN TREATING MACHINE
Filed June 26, 1925    6 Sheets-Sheet 6

Patented Apr. 6, 1926.

1,580,008

UNITED STATES PATENT OFFICE.

JAMES M. BUCHANAN, OF MOUNTAIN VIEW, MISSOURI.

STRING-BEAN-TREATING MACHINE.

Application filed June 26, 1925. Serial No. 39,820.

*To all whom it may concern:*

Be it known that I, JAMES M. BUCHANAN, a citizen of the United States, residing at Mountain View, in the county of Howell and State of Missouri, have invented new and useful Improvements in String-Bean-Treating Machines, of which the following is a specification.

This invention relates generally to machines for preparing vegetables for use or treatment in canning factories and the like, and has for its object the provision of a novel machine for treating string beans preparatory to cooking and canning, the device being so constructed as to cut the ends from the beans and subsequently cut the beans into small pieces of the size usually preferred for canning purposes.

An important object is the provision of a machine of this character embodying an automatically acting grading means whereby beans of excessive maturity and size will be discarded or rejected and only those coming up to a certain standard permitted to enter the cutting mechanism.

Another object of the invention is to provide an apparatus of this character which will cut the beans into pieces of uniform length in accordance with the preference of canners.

A more specific object of the invention is to provide a machine of this character embodying conveyors for carrying the sorted or graded string beans into engagement with rotary elements acting to cut, break or snap the ends of the beans, an arrangement of knives being provided in association with one of the conveyors for actually cutting the beans into a plurality of pieces of uniform length.

Another object is to provide a machine of this character so constructed and arranged that the various moving parts thereof may be driven by a single main or operating shaft, all the elements being properly timed to bring about the successive operation in proper sequence.

An additional object is to provide a machine of this character which will be comparatively simple and inexpensive to manufacture, easy to control and operate, positive in action, efficient and durable in service, and a general improvement in the art.

With the above and other objects and advantages in view, the invention consists in the details of construction and the combination and arrangement of parts to be hereinafter more fully described and claimed, and illustrated in the accompanying drawings, in which:—

Figure 1:
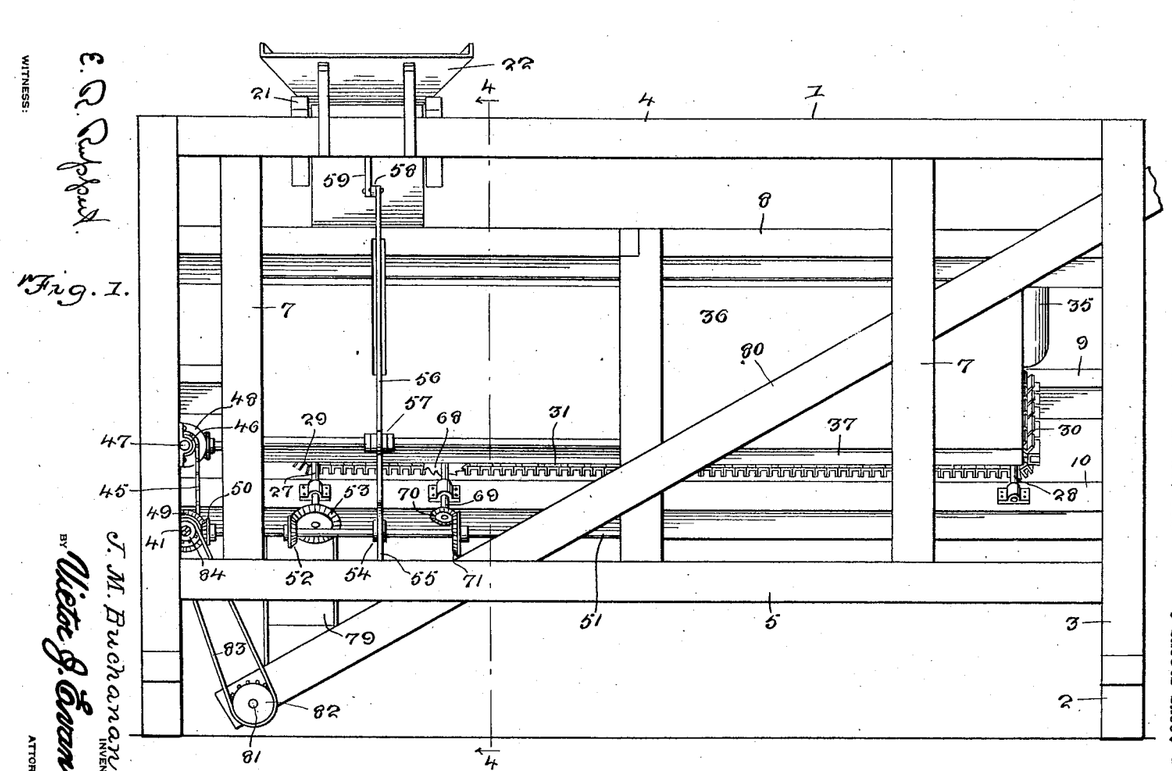
Figure 1 is an elevation of one side of the machine.
Figure 2:
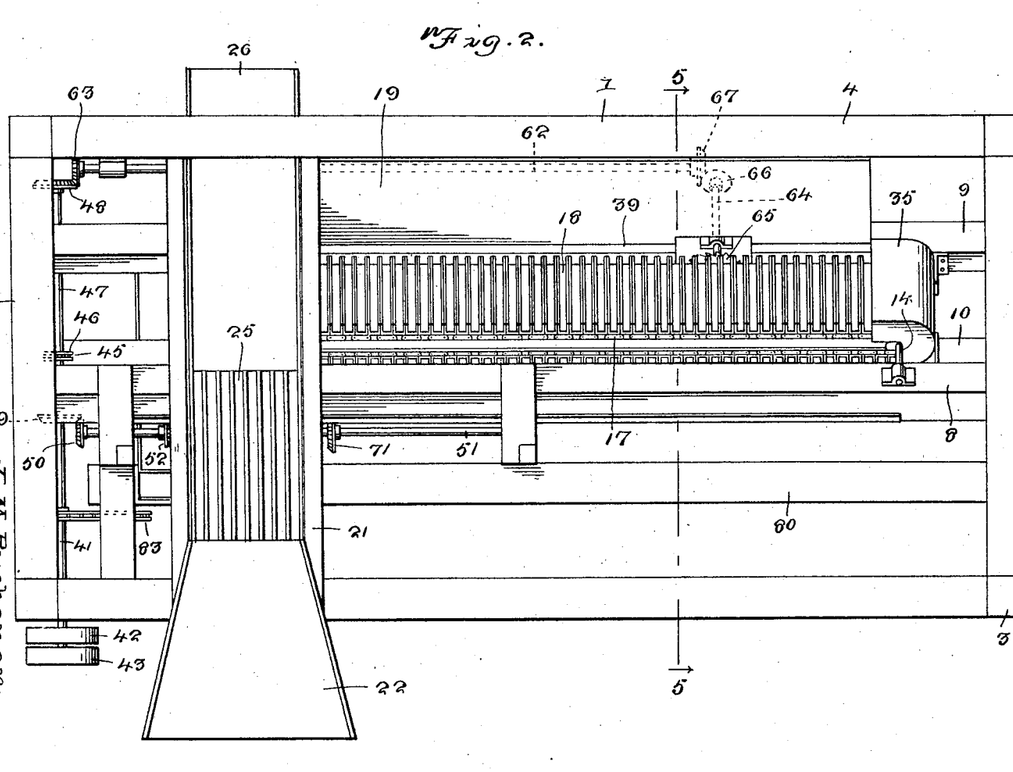
Figure 2 is a top plan view thereof.
Figure 3:
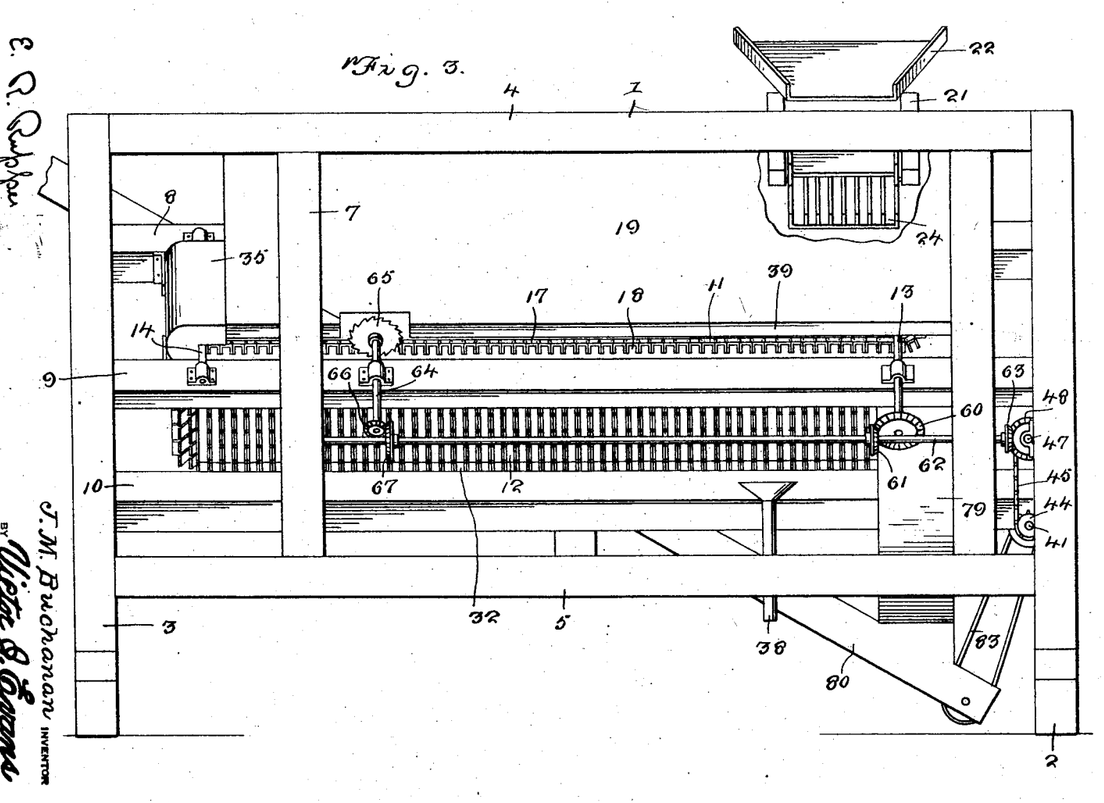
Figure 3 is an elevation of the opposite side.
Figure 4:
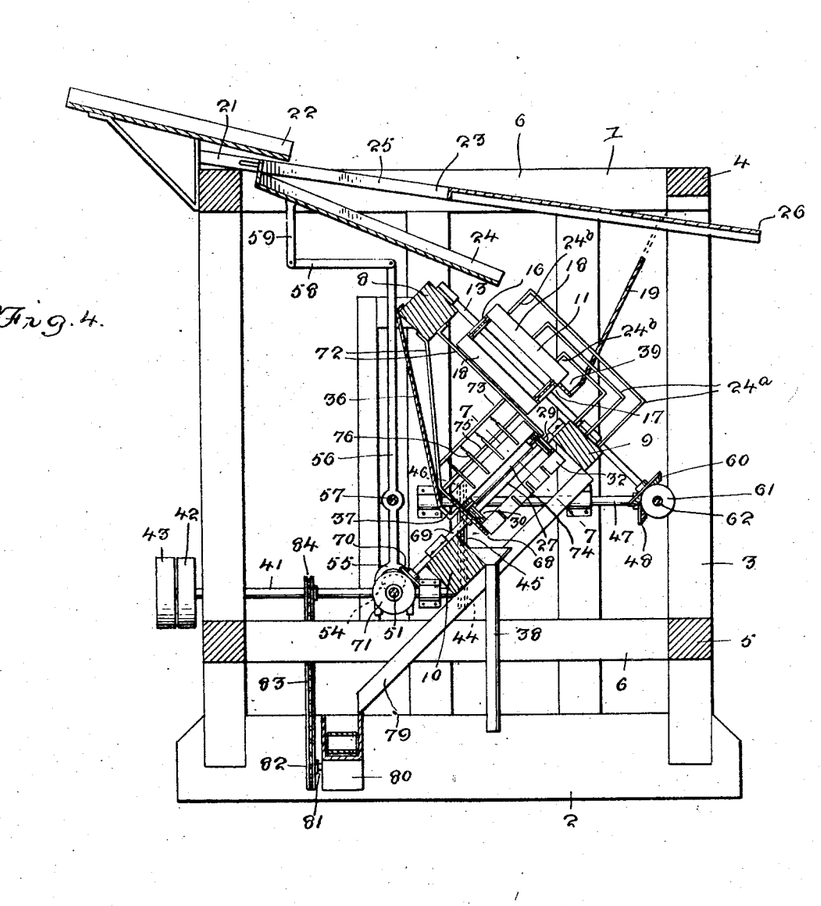
Figure 4 is a vertical cross section taken on the line 4—4 of Figure 1 looking in the direction of the arrows.
Figure 5:
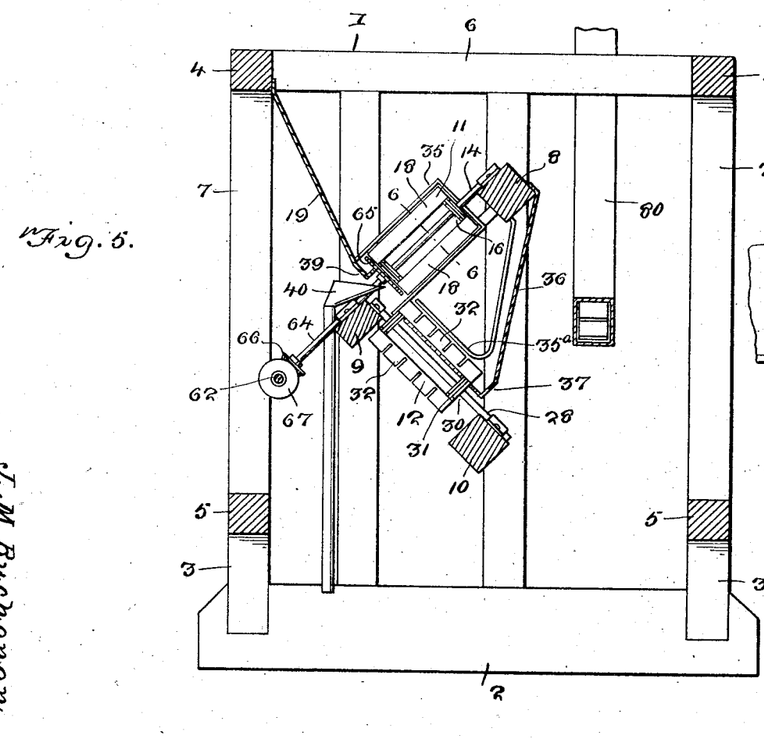
Figure 5 is a vertical cross section taken on the line 5—5 of Figure 2 looking in the direction of the arrows.
Figure 6:
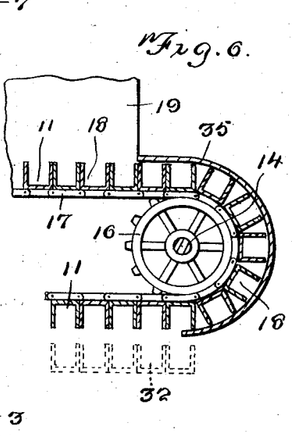
Figure 6 is a detail cross section taken on the line 6—6 of Figure 5.
Figure 7:
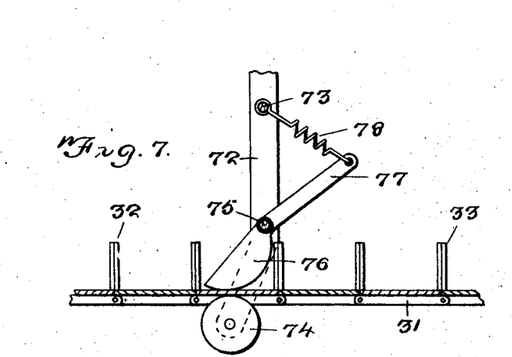
Figure 7 is a detail longitudinal section through one of the conveyors showing the bean cutting means cooperating therewith.
Figure 8:
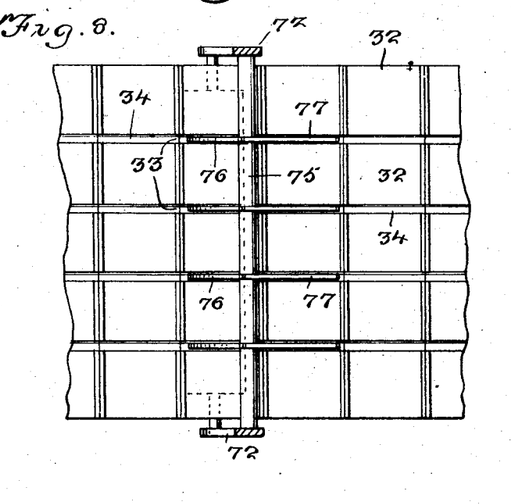
Figure 8 is a plan view of the mechanism shown in Figure 7.
Figure 9:
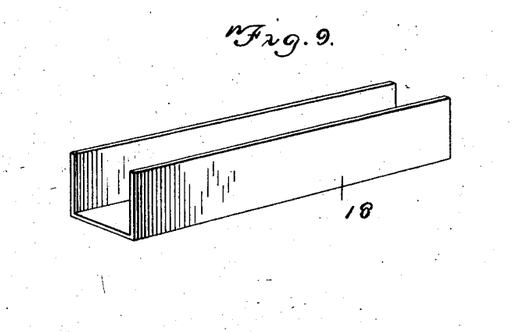
Figure 9 is a detail perspective view of one of the conveyor buckets or pockets.
Figure 10:
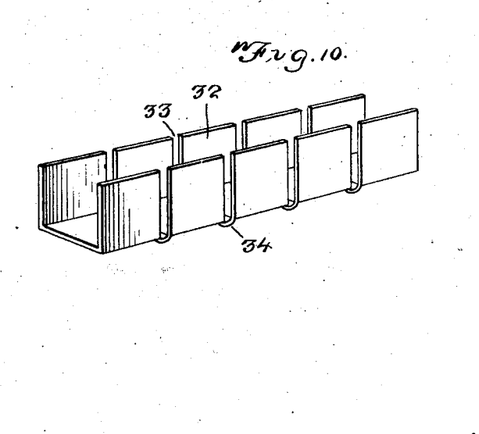
Figure 10 is a similar view of one of the buckets or pockets of the other conveyor.

Referring more particularly to the drawings, I have shown the device as comprising a suitable frame designated generally by the numeral 1, which frame may be of any desired or necessary size, shape and construction, and including sills 2 from which rise uprights 3 connected by upper and lower longitudinal bars 4 and 5 and by cross bars 6. Uprights 7 may be provided between the longitudinal bars 4 and 5 at any point found necessary. The frame further includes longitudinally extending bars 8, 9 and 10, arranged as well illustrated in Figure 5 to form supporting means for certain mechanism to be described.

Mounted within the frame and extending longitudinally thereof are two conveyors designated generally by the numerals 11 and 12 and these conveyors are laterally inclined as shown and arranged one above the other for a purpose to be described. The upper conveyor 11 comprises a pair of shafts 13 and 14 carrying sprockets 15 and 16 respectively about which are trained chains 17 secured to and carrying a plurality of elongated preferably rectangular buckets or pockets 18 open at both ends. These buckets or pockets are arranged with one end downward and spaced above a guard or shield 19 which is suitably mounted within the frame and which extends longitudinally thereof throughout its major portion, for the purpose of evening the beans in the buckets preparatory to snapping or cutting.

Mounted above the frame 1 near one end thereof and located above guides 21 therein is a hopper 22 onto which are deposited the string beans to be worked upon or treated. This hopper is formed at substantially its central portion with an opening 23 beneath which is located a feed tray 24 movable along the guides 21 and extending down to a point slightly above the upper conveyor 11. Extending longitudinally of the opening 23 is a grating 25 including a plurality of bars or other elements spaced apart a distance corresponding to the maximum thickness of a bean suitable for canning purposes. Obviously, beans which are too thick cannot pass between the bars of the grid or grating and when a number of such have accumulated they will pass off along a chute or table 26 at the far side of the machine and may of course be collected within any suitable receptacle provided for the purpose.

The tray 24 is formed to provide a plurality of troughs which correspond to and which lead to the buckets 18 of the upper conveyor so that the beans passing through the grating 25 onto the tray 24 will be distributed by the latter into the successive buckets 18 of the upper conveyor as the latter moves along. To assist in laying the beans lengthwise within these buckets and to prevent any of them from falling askew, I preferably make use of a plurality of angular guard members 24$^a$ which may be formed as suitable lengths of wire rod and which have their end portions 24$^b$ so arranged that they will be on a line with the open top of the buckets 18 for scraping off any excessive number of beans which might be in a bucket and which would protrude beyond the top thereof.

The lower conveyor 12 comprises a pair of shafts 27 and 28 suitably journaled and supported from the bars 9 and 10, these shafts carrying sprockets 29 and 30 about which are trained chains 31 secured to and carrying a plurality of similar elongated buckets or pockets 32 which are similar to the buckets 18 having both ends open.

Furthermore, the sides of the buckets 32 are formed with slots 33 and the bottom portions are pressed downwardly as indicated at 34 at points opposite the slots or in registration therewith, for a purpose to be described.

Located at the discharge end of the upper conveyor 11 is a curved shield or guard 35 concentric with the shaft 14 and leading from the rear edge of the shield 19. This member 35 constitutes means for effecting the transfer of the beans from the buckets 18 to the buckets 32 and for this reason the lower edge of the member 35 extends to a point adjacent the buckets 32 where the latter pass around the sprockets 30. For scraping off any excess beans in a bucket I provide an arm 35$^a$. Extending longitudinally of the frame is a shield or guard 36 terminating at its lower edge in a trough 37 located beneath the buckets 32 of the lower conveyor, and engageable by the beans for effecting evening thereof. Receiving from the trough 37 is a discharge chute or spout 38 provided for a purpose to be described. It should be stated that the shield or guard 19 previously described terminates at its lower edge in a trough 39, similar to the trough 37 and discharging into an outlet chute or spout 40 likewise for a purpose to be described.

Suitably journally mounted on the frame 1 is a main drive shaft 41 preferably equipped with fast and loose pulleys 42 and 43 and adapted to be rotated by any desired means. This shaft 41 carries a sprocket 44 about which is trained a chain 45 in turn trained about a sprocket 46 on a shaft 47 mounted above the shaft 41 and equipped with a bevel gear 48. The shaft 41 also carries a bevel gear 49 meshing with a bevel gear 50 upon one end of a horizontally disposed shaft 51. On the shaft 51 is a bevel gear 52 meshing with a bevel gear 53 on the lower end of the shaft 27 of the lower conveyor.

As stated above the hopper 22 is intended to be reciprocated for the purpose of effecting grading or assorting of the beans placed thereon and to accomplish this movement, I have shown the shaft 51 as equipped with a cam 54 operating within a fork or yoke 55 on the lower end of a lever 56 which is pivoted intermediate its ends as shown at 57 and which has its other end or upper end pivotally connected, by a link 58 with the lower end of an arm 59 depending from the chute portion 26 of the hopper. Obviously, when the shaft 51 is rotated the cam thereon will act to move the lever and link mechanism for moving the hopper structure 22 back and forth across the frame for carrying out the specified purpose.

The drive mechanism for the lower conveyor has already been described, and in order to effect driving of the upper conveyor 11, the shaft 13 at the forward end thereof is preferably equipped with a bevel gear 60 meshing with a bevel gear 61 on a shaft 62 which extends longitudinally of the frame and which carries a bevel gear 63 meshing with the above described bevel gear 48. By this means, it is obvious that the two conveyors will be driven synchronously. The upper conveyor buckets are intended to receive the string beans passing from the hopper and to carry them to the guard casing or housing 35 where the beans will be transferred to the lower conveyor.

In machines of this character and for this purpose it is necessary that the string beans used be snapped or cut to remove the ends therefrom. In carrying out this feature I provide a shaft 64 suitably journaled in the frame and carrying a saw 65 located in such position as to be engaged by the lower projecting ends of the beans carried by the buckets 18 for the purpose of effecting snapping or cutting thereof. The shaft 64 carries a bevel gear 66 meshing with a bevel gear 67 on the shaft 62 so as to be driven at the necessary speed to effect the desired action. Located beneath the lower conveyor 12 is a similar saw 68 carried by a shaft 69 equipped with a bevel gear 70 meshing with a bevel gear 71 on the shaft 51.

In the operation of the machine up to this point, it will be seen that beans passing from the hopper through the grid or grating will pass into the successive buckets 18 of the upper conveyor 11, the lower ends of the beans protruding beyond the open lower ends of the buckets and traveling along the trough 39 which brings the ends of the beans even or in line. Upon reaching the saw 65 the projecting lower ends of the beans will be snapped, broken or cut off, the cutoff ends dropping out through the chute 40 which is positioned at a point near the saw. Upon reaching the sprockets at the far end of the upper conveyor, the buckets 18 travel along within the guard 35 which forms a closure for the open sides thereof as they become inverted during travel around the sprocket. As soon as the buckets 18 pass off from the lower or trough portion 39 of the guard 19 the beans contained within these buckets will drop into the buckets 32 of the lower conveyor 12, the previously uncut ends of the beans then projecting beyond the lower ends of the buckets 32 so as to be cut off by the saw 68. The cut off ends drop out through the spout or chute 38. At this time it will be seen that both ends of all the beans have been cut off, thus complying with a very important requirement.

The next important step is the cutting of the beans into comparatively small pieces. In carrying out this feature, I provide suitable supports or arm members 72 located above and below the lower conveyor 12, or at opposite sides thereof, which supports or arms are connected by a transverse rod 73. Mounted on the supports or arms are rollers 74 which bear against the undersides of the chains 31 for holding them against sagging at this particular point. A second rod 75 extends across the space between the arms or supports 72, and pivoted on this second named rod intermediate their ends are blades 76 so spaced as to enter and pass through the slots 33 in the buckets 32 during the travel thereof. These blades have extensions 77 with which are connected coil springs 78 which in turn are connected with the rod 73 and provided for the purpose of holding the blades 76 in operative position while permitting yielding thereof in case of necessity.

In the operation of the cutting feature, it will be apparent that the beans contained within the buckets 32 will be drawn transversely beneath all the knives or cutters 76, these latter consequently operating to cut the beans into pieces of a length corresponding to the distance between the successive slots 33. Owing to the fact that the bottoms of the buckets 32 are formed with a depressed portion 34 in registration with the buckets 33 it is evident that the blades can pass entirely through the beans so that severing will be assured. In case the beans are too small to be cut, they may be evened up and snapped or cut at the ends and the cutting mechanism for cutting them into small pieces be moved to inoperative position.

Mounted in an inclined position below the lower conveyor 12 and at such a point as to receive the beans which will fall out of the buckets 32 at the end of the conveyor, is a downwardly inclined guide chute 79 discharging into the lower end of an upwardly inclined elevator 80 containing any suitable type of endless conveyor mechanism which may consist of belts, chains or the like and operated by means of a shaft 81 carrying a sprocket 82 about which is trained a chain 83 in turn engaged about a sprocket 84 on the main drive shaft 41.

After the ends of the beans have been cut off as above described, and after the beans have been dragged through beneath the knives and consequently cut into small pieces, it will be seen that all these pieces of beans will drop out of the buckets 32 at the proper point and will fall onto the guide chute 79 which will conduct them into the lower end of the elevator 80 through which the beans will be carried upwardly and outwardly and discharged into any suitable receptacle or the like provided for the purpose.

From the foregoing description and a study of the drawings, it will be apparent that I have thus provided a comparatively simple and yet highly efficient device by means of which string beans may be grated or assorted, cut or snapped, cut into small pieces and subsequently delivered to any desired point for cooking or further treatment. It is believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:

1. In a machine of the character described, a supporting frame, a pair of oppositely traveling conveyors mounted therein, one above the other and arranged at an angle with respect to each other, guard means connecting the discharge end of the upper conveyor with the intake end of the lower conveyor, hopper means for depositing string beans upon the intake end of the upper conveyor, and means located adjacent the lower edges of both conveyors for cutting off the ends of beans.

2. In a machine of the character described, a supporting frame, a pair of oppositely traveling conveyors mounted therein, one above the other and arranged at an angle with respect to each other, guard means connecting the discharge end of the upper conveyor with the intake end of the lower conveyor, hopper means for depositing string beans upon the intake end of the upper conveyor, and means located adjacent the lower edges of both conveyors for cutting off the ends of beans, guide members mounted in the frame and engageable by the lower edges of both conveyors, and outlet spouts leading from said guard members at points adjacent said cutting means for carrying away the cutoff ends of the beans.

3. In a machine of the character described, a supporting frame, a pair of oppositely traveling conveyors mounted therein, one above the other and arranged at an angle with respect to each other, guard means connecting the discharge end of the upper conveyor with the intake end of the lower conveyor, hopper means for depositing string beans upon the intake end of the upper conveyor, and means located adjacent the lower edges of both conveyors for cutting off the ends of beans, said means comprising rotary saws positioned in the path of travel of the beans carried by the conveyors.

4. In a machine of the character described, a supporting frame, a pair of oppositely traveling conveyors mounted therein, one above the other and arranged at an angle with respect to each other, guard means connecting the discharge end of the upper conveyor with the intake end of the lower conveyor, hopper means for depositing string beans upon the intake end of the upper conveyor, and means located adjacent the lower edges of both conveyors for cutting off the ends of the beans, the feed means comprising a hopper mounted above the intake end of upper conveyor and provided with a grid, and means for oscillating the hopper.

5. In a machine of the character described, a supporting frame, a pair of oppositely traveling conveyors mounted therein, one above the other and arranged at an angle with respect to each other, guard means connecting the discharge end of the upper conveyor with the intake end of the lower conveyor, hopper means for depositing string beans upon the intake end of the upper conveyor, and means located adjacent the lower edges of both conveyors for cutting off the ends of the beans, the feeding means comprising a hopper mounted at the upper portion of the frame above the intake end of the upper conveyor, means guidably mounting the hopper, and means for reciprocating the hopper, the hopper being provided in its bottom with spaced elements constituting a sorting grating.

6. A machine of the character described comprising a supporting frame, inlet means at one end of the frame, a pair of longitudinally traveling conveyors mounted within the frame and traveling in opposite directions, said conveyors being mounted at an angle to each other, means at the discharge end of the upper conveyor leading to the inlet end of the lower conveyor for conducting string beans carried by the upper conveyor onto the lower conveyor, guard means beneath the lower edges of both conveyors, a discharge chute leading from said guards and rotary saws located above said discharge chute in position to cut off the projecting lower ends of the beans carried by the conveyors.

7. A machine of the character described comprising a supporting frame, inlet means at one end of the frame, a pair of longitudinally traveling conveyors mounted within the frame and traveling in opposite directions, said conveyors being mounted at an angle to each other, means at the discharge end of the upper conveyor leading to the inlet end of the lower conveyor for conducting string beans carried by the upper conveyor onto the lower conveyor, guard means beneath the lower edges of both conveyors, a discharge chute leading from said guards and rotary saws located above said discharge chute in position to cut off the projecting lower ends of the beans carried by the conveyors, an upwardly extending elevator mounted in inclined position within the frame, and a chute receiving from the discharge end of the lower conveyor and leading into the lower end of the elevator.

8. A machine of the character described comprising a supporting frame, inlet means at one end of the frame, a pair of longitudinally traveling conveyors mounted within the frame and traveling in opposite directions, said conveyors being mounted at an angle to each other, means at the discharge end of the upper conveyor leading to the inlet end of the lower conveyor for conducting string beans carried by the upper conveyor onto the lower conveyor, guard means beneath the lower edges of both conveyors, a discharge chute leading from said guards, and rotary saws located above said discharge chute in position to cut off the projecting lower ends of the beans carried by the conveyors, an upwardly extending elevator mounted in inclined position within the frame, and a chute receiving from the discharge end of the lower conveyor and leading into the lower end of the elevator, and means for simultaneously driving both conveyors, the saws and the elevator.

9. A machine of the character described comprising a supporting frame, inlet means at one end of the frame, a pair of longitudinally traveling conveyors mounted within the frame and traveling in opposite directions, said conveyors being mounted at an angle to each other, means at the discharge end of the upper conveyor leading to the inlet end of the lower conveyor for conducting string beans carried by the upper conveyor onto the lower conveyor, guard means beneath the lower edges of both conveyors, a discharge chute leading from said guards and rotary saws located above said discharge chute in position to cut off the projecting lower ends of the beans carried by the conveyors, and a plurality of knives located in the path of travel of beans carried by the lower conveyor for cutting the same into a plurality of pieces.

10. A machine of the character described comprising a supporting frame, inlet means at one end of the frame, a pair of longitudinally traveling conveyors mounted within the frame and traveling in opposite directions, said conveyors being mounted at an angle to each other, means at the discharge end of the upper conveyor leading to the inlet end of the lower conveyor for conducting string beans carried by the upper conveyor onto the lower conveyor, guard means beneath the lower edges of both conveyors, a discharge chute leading from said guards and rotary saws located above said discharge chute in position to cut off the projecting lower ends of the beans carried by the conveyors, the lower conveyor including a series of buckets formed with transversely extending slots in the sides thereof, a supporting element mounted above the lower conveyor, and a plurality of spring pressed knives mounted on said supporting element, passing through the slots in said conveyor buckets and acting to cut the beans therein into a plurality of pieces.

In testimony whereof I affix my signature.

JAMES M. BUCHANAN.